July 6, 1965 A. A. HALACSY 3,193,757
DEVICE FOR AN ELECTROMAGNETIC CIRCUIT
Filed Sept. 23, 1959 9 Sheets-Sheet 1

July 6, 1965  A. A. HALACSY  3,193,757
DEVICE FOR AN ELECTROMAGNETIC CIRCUIT
Filed Sept. 23, 1959  9 Sheets-Sheet 6

July 6, 1965     A. A. HALACSY     3,193,757
DEVICE FOR AN ELECTROMAGNETIC CIRCUIT
Filed Sept. 23, 1959     9 Sheets-Sheet 9

United States Patent Office 3,193,757
Patented July 6, 1965

3,193,757
DEVICE FOR AN ELECTROMAGNETIC CIRCUIT
Andrew A. Halacsy, 380 Irvington St., Elizabeth, N.J.
Filed Sept. 23, 1959, Ser. No. 842,177
10 Claims. (Cl. 323—51)

This application is a continuation-in-part of an application made by Andrew A. Halacsy, filed October 3, 1955, Serial No. 537,920 for a Device for an Electromagnetic Circuit now abandoned.

This invention relates generally to the controlling of electrical currents in inductive circuits and more particularly to an improved electromagnetic switch and voltage regulator for varying and ultimately interrupting and re-establishing the magnetic coupling between an inductive circuit and a power circuit.

Generally the flow of electrical energy in a circuit is interrupted by breaking a galvanic link in the circuit by means of a circuit breaker or a switch. The arc that develops between the separating contacts of such galvanic elements is inherent in their operation and tends to burn the contacts. The arcs also may be a danger in an inflammable environment.

Continuous efforts have been made to avoid such arcs, or at least to confine them to a flame and explosion proof space. Arcs may be avoided by synchronizing the separation of the contacts with the instant of current reversal in an A.C. circuit. Devices operating according to such a principle are complex, not inherently arc proof, and expensive. Explosion-proof enclosures are reasonably safe in explosive atmospheres existing in mines, oil refineries and other chemical plants, as long as the explosion proof cover is faultless. However, such devices are heavy, expensive, and require additional safety features, such as interlocks.

The electro-magnetic switch finds its utility in overcoming the above enumerated deficiencies and difficulties. It opens and closes an inductive electro-magnetic coupling between two electrical circuits by breaking the path of the magnetic flux in the coupling. A switch of this type inherently cannot arc in operation and does not depend on the timing of the operation for the prevention of arcing. It is thus inherently explosion proof without an explosion proof cover in an explosive atmosphere or environment.

The invention is based on the recognition that where two electrical circuits are inductively coupled, the flow of electrical energy in the circuit not galvanically connected with a source of electrical power, commonly called the secondary circuit, can be varied, interrupted and re-established without arcing by varying, interrupting and re-establishing the continuity of the medium carrying the magnetic flux in the inductive coupling. However, use of the electro-magnetic switch has not become general because it does not interrupt the flow of current in the circuit that is galvanically connected to a source of electrical power, commonly called the primary circuit, but rather, causes an increase in the flow of electrical energy in the primary circuit by removing the inductive load of the secondary circuit. The increased flow of electrical energy in the primary circuit may cause an element in the circuit to burn out.

It is therefore an object of the invention to provide an electro-magnetic switch which will operate without increasing the flow of electrical energy in a primary electrical circuit when interrupting and re-establishing the flow of electrical energy in a secondary circuit.

Another object of the invention is to provide a voltage regulator which will operate to control the voltage in the secondary circuit without varying the voltage in the primary circuit.

Another object of the invention is to provide an electromagnetic control means in which the moving and stationary parts are biased into close sliding contact to eliminate air gap noise and chatter.

Another object of the invention is to provide an electromagnetic switch and voltage regulator for use with three phase alternating current.

Another object of the invention is to provide an electromagnetic circuit breaker for opening the path of magnetic flux when an overload occurs in the secondary circuit.

Another object of the invention is to provide a magnetic switch and voltage regulator controlled by rotary motion to provide continuous and cyclical up and down voltage regulation without changing the direction of the rotation.

A feature of the invention is the interruption of the path of the magnetic flux between the primary and secondary circuit in two places. Unlike the breaking of a galvanic circuit, the efficiency of breaking an electro-magnetic circuit is improved by the double breaking action.

Another feature of the invention is that the electro-magnetic coupling is broken in a direction normal to the flow of flux in the coupling thus reducing to a minimum the magnetic forces opposing the break.

Other objects and features of the invention will become apparent and better understood from the appended description and claims and the accompanying drawing in which:

Figure 1:
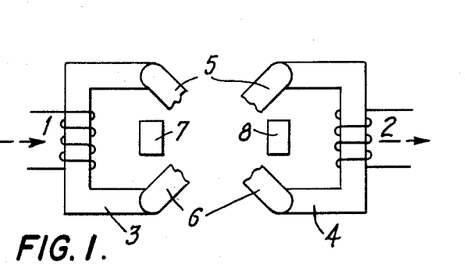
FIG. 1 is a schematic sketch showing an application of the principle of interrupting an electro-magnetic circuit, and establishing a magnetic bypass simultaneously.

FIG. 1 shows the principle of the invention. Electrical energy flows through coil 1 and coils 1 and 2 are inductively linked by magnetic flux flowing through a metal core 3 and 4.

Switching members 5 and 6 of the metal core are mobile. The continuity of the magnetic core can be interrupted by moving the switching members, for example, by swinging the switching members 5 and 6 to a position as indicated in the FIG. 1. By so doing the flow of flux in the metal core is interrupted and the electro-magnetic coupling of coils 1 and 2 is broken because practically no energy will flow to coil 1 and 2 when the links are in the indicated position. The expression "practically" is used because some very small amount of energy may penetrate in coil 1 to coil 2 by magnetic leakage even if the magnetic core is interrupted. This is similar to the situation existing in a conventional circut breaker where a very small amount of energy may penetrate from one contact to the other by leakage and delectric coupling.

While a simple device, opened as shown in FIG. 1, may be used in some cases, it will not be generally satisfactory because the wide opening of the magnetic core reduces the permeance of the magnetic circuit, and consequently the inductance of the inductively connected electric circuit, in a degree such as to allow an increase of the current to an undesired and sometimes dangerous value in the coil 1 which is connected to a source of electrical energy at constant voltage. In order to keep the current down to a proper value in coil 1, switching members 5 and 6 must be rotated to contact the magnetic by-passes 7 and 8 which can be made, but not necessarily, of the same material as the parts 3 and 4 of the core.

In the device, built according to the principle shown in FIG. 1 switching members 5 and 6 not only interrupt the connection between parts 3 and 4 of the core when swung to contact parts 7 and 8, but also close other paths for the magnetic flux, via parts 7 and 8. These paths are respectively linked with coils 1 and 2. The proper dimensioning of these magnetic paths can keep their magnetic permeance to a value, resulting in an inductance of the coils which keeps their respective currents within desired limits. A further advantage of the arrangement shown shown in FIG. 1 is that the path of high permeance offered to the magnetic flux through parts 7 and 8 reduces the leakage from coil 1 to coil 2.

Figure 2:
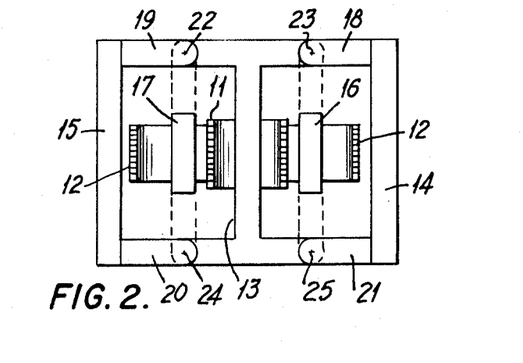
FIG. 2 is a schematic sketch showing a sectional elevation of the device similar to a two-winding, core-type transformer with a special core built according to the invention.

While a device built according to the principles shown in FIG. 1 may suit in some cases, it will not suit in most practical cases because its very high leakage reactance causes very great regulation at higher loads as this device operates like a transformer. This invention recognizes that such a device should be built according to practices well known and accepted in the art of transformer design. A practical device incorporating such forms of design is shown in FIG. 2 which is a schematic sectional elevation of such a device. Where FIG. 1 shows a device similar to a shell type transformer, FIG. 2 shows a sectional elevation of a device similar to a two-winding core type transformer with a special core built according to the invention. It is understood that devices built according to the invention may have forms of either type of transformer.

The coil 11 is shown as a single layer barrel-winding wound of a wire of circular cross-section, in FIG. 2. The invention is, however, not restricted to any particular material of wire and/or insulation. The coil 12 is also shown as a single layer barrel-winding wound of a wire of circular cross-section. Coils 11 and 12 can be wound by any method and to any shape known in the art without affecting the efficiency of the invention.

Both coils 11 and 12 are assembled on the same primary center leg 13 of the core. The core comprises the primary leg 13, two oppositely disposed outer legs 14 and 15, two oppositely disposed secondary legs 16 and 17 intermediate the primary leg 13 and the outer legs 14 and 15 respectively. Movable switching members 18 and 19 connect the upper ends of primary leg 13 with the upper ends of outer legs 14 and 15 or alternatively with the upper ends of legs 16 and 17, and movable switching members 20 and 21 connect the lower end of primary leg 13 with the lower ends of outer legs 14 and 15 or alternatively with lower ends of secondary legs 16 and 17. All parts of the core are built of a material of suitable magnetic properties and dimensions, as generally known in the art of transformer steel with .73 watt per pound loss at 15 kilogauss induction, or other kinds of steel sheets used in the manufacture of transformers. Any other material can be used if special conditions require it. For instance, a differently composed material of thinner gauge may be required at higher frequencies or a special heat-resisting coating may be required at higher temperatures. The invention is not restricted to any particular size or type of core, although a laminated core is preferred, as in conventional transformers, mainly in order to reduce eddy-current losses. Cores composed of wire, powder or undivided material can be used as well, if required for some special reason. For instance, in high frequency applications, a powdered core may be preferred. In the case of a direct current excitation of a part of the core, this part may be of undivided material. In summarizing, coils 11 and 12 are wound, and the core is built according to the presently well known principles and practice of transformed design and manufacture. The core may be laminated and clamped and kept together by any method known in the art. The methods of clamping is neither novel nor the subject of this invention, and is not shown in FIG. 1.

Outer legs 14 and 15 are positioned outside the coils 11 and 12 and adjustably joined with leg 13. They provide a path for the magnetic flux linking both coils 11 and 12. Legs 16 and 17 are between the coils 11 and 12, and, when joined to leg 13, provide a closed magnetic circuit in which the flux generated by coil 11 does not generate any electrical voltage in coil 12.

Magnetic switching members 18, 19, 20 and 21 at the top and at the bottom of the core, are built of materials similar to the other parts of the core described above. The members are pivoted by pivots 22, 23, 24 and 25 to the ends of part 13. This pivoting allows a free rotation of the switching members 18, 19, 20 and 21 around the axis of the pivots fixed to leg 13. The pivoted ends of the switching members 18, 19, 20 and 21 and the mating ends of part 13 are shaped to fit to each other with an air gap as small as possible between them, not only in the position of the switching member shown in full lines, but also in the position of the switching member shown in broken lines and in the position between these two. This shape is the shape of a circular cylindrical surface shown in FIG. 2. It can have, however, any other shape satisfying said requirement, and examples are shown in the FIGS. 3 through 7 described below. The free ends of the switching members 18, 19, 20 and 21 are shaped so as to fit to the mating ends of the intermediate legs 16 and 17 with the smallest possible air gaps when the switching members 18, 19, 20 and 21 are moved to their position shown in broken lines. The cross sections of these mating ends are sections of circular cylinders, the axis of which coincide with the respective axes of the corresponding pivots.

The device shown in FIG. 2 operates as a conventional transformer, if the switching members 18 and 19 are in their position shown in full lines. If coil 11 is connected to an electric supply, said coil 11 conveys electro-magnetic energy to coil 12 through the magnetic circuit in the core composed of parts 13, 14, 18 and 21 and through the magnetic circuit in the core composed of parts 13, 19, 15 and 20 because both coils 11 and 12 are linked with these closed magnetic circuits. The reluctance of said magnetic circuits is increased when the switching members 18, 19, 20 and 21 are moved by hand or by any mechanical or electrical means from their position shown in full lines towards their other position shown in broken lines, such a movement being a rotation around the pivots 22, 23, 24 and 25. As the switching members 18, 19, 20 and 21 approach the secondary legs 16 and 17 the closer they get, the more the reluctance of the magnetic circuits is reduced through parts 13, 16, 18 and 21, and through parts 13, 17, 19 and 20 with a consequent increase of the magnetic flux through the legs 16 and 17. While the center leg 13 is common to all magnetic circuits in any position of the switching members, the magnetic flux is transferred from the outer legs 14 and 15 to secondary legs 16 and 17 gradually, and depending on the speed with which the switching members 18, 19, 20 and 21 swing from their position shown in full lines, to their position shown in broken lines. A change in the magnetic flux of a magnetic circuit causes a change in the electric voltage in a coil linked with that flux.

Coil 12 is linked with the magnetic flux permeating the circuits 13, 14, 18 and 21, and 13, 15, 19 and 20, but not with the magnetic flux permeating the circuits 13, 16, 18 and 21, and 13, 17, 19 and 20 so that its voltage will change, according to the changes of the magnetic flux permeating the circuits 13, 14, 18 and 21, and 13, 15, 19 and 20, only. The alternating flux in legs 14 and 15, and consequently, the R.M.S. value of the alternating voltage in coil 12 is reduced from its full value to practically nil as the switching members 18, 19, 20 and 21 swing from their position, shown in full lines, to their position, shown in broken lines, if coil 11 is fed by an alternating current. A voltage in ratio with the time derivative of the flux changing in legs 14 and 15, is induced in coil 12, when coil 11 is fed by a direct current. The changes occur in the reverse order when the switching members 18, 19, 20 and 21 move from their position shown in broken lines to their position shown in full lines; such movement being a swing around the pivots 22, 23, 24 and 25 opposite to the previous one. A reduction of the voltage across coil 12 to zero has an effect comparable to a break in the circuit of coil 12. For that reason, the movement of the switching members 18, 19, 20 and 21, from their position shown in full lines to their position shown in broken lines is a break of the electromagnetic circuit and in effect a break of the energy-flow, in the galvanic circuit of the secondary circuit of coil 12, without actually physically breaking the galvanic circuits and so is accomplished without arcing. The device acts as a circuit breaker in this case.

Coils 11 and 12 are shown in FIG. 2 as being positioned symmetrically in relation to each other in radial and in axial directions so as to have a common electro-magnetic center. Such a geometrical arrangement is favored in order to achieve low values of leakage reactance and of the short circuit forces in transformer-like devices. A 2 to 4 percent reactance is usual in such devices with an output of less than 100 kva., the reactance rising with the kva. and the voltage up to about 6 percent in devices with an output of about 1000 kva. and 12,000 volts. Devices, in which the respective coils are not telescoped but arranged in different legs of the same core or in some axial distance from each other on the same leg, may have a reactance in the range of 20 to 50 percent, which value is intolerably great in most cases of power transmission because of the great voltage regulation it causes. There are known voltage regulating devices or devices for interrupting the flow of energy by means of moving parts of the magnetic core, however, without telescoped coils, and therefore, all those devices have very high reactance. An inherently low reactance can be achieved by telescoping the coils. The placing of a leg of a magnetic core between the two coils permits the mechanical interruption and/or regulation of the magnetic flux linking the two coils in such cases.

The above description and the illustrating figures disclose two coils and one core for reasons of simplicity. It is understood, however, that the invention is not restricted to devices containing such a limited number of coils and cores.

FIGS. 1 and 2 show switching members alternatively connecting various parts of the magnetic core. This invention is not restricted to the above described types of switching members and examples of other arrangements are shown in FIGS. 3 through 7. Such switching members may be united with one or another part of the core as exemplified in FIGS. 3 through 7. Full lines show switching members in the closed position, while broken lines show them in the open position. Dash-dotted lines mark axes of rotation in FIGS. 3 through 7. Only one of the switching members and the adjacent parts are shown in FIGS. 3 through 7 for reasons of simplicity, the rest being identical with FIG. 2.

Figure 3:
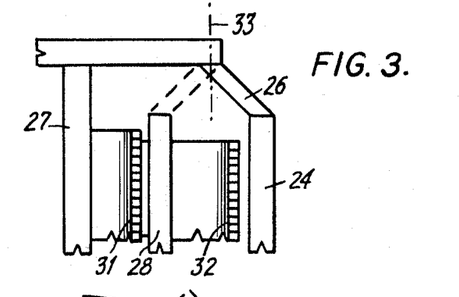
FIG. 3 is a schematic sketch showing a modification of the upper right hand corner of FIG. 2 improved in detail as another embodiment of the invention.

Another embodiment of the invention changing the structure illustrated in the upper right hand corner of FIG. 2, is specifically shown in FIG. 3 which is a sectional elevation of the changed parts and shows another type of a switching member 26 interrupting, regulating and reestablishing the continuity of the magnetic path between the center leg 27, secondary leg 28 and the outer leg 29, respectively. Primary coil 31 and secondary coil 32 are assembled on the center leg 27 of a core built of a material of suitable magnetic properties and dimensions, in a way described above in connection with FIG. 2, secondary leg 28 is between coils 31 and 32. The outer leg 29 is outside with the coils 31 and 32. The internal construction and arrangement of all these legs is identical with legs 13, 14 and 16 in FIG. 2 but their ends have a modified shape to match the modified ends of the mobile link 26. The top of the center leg 27 reaches beyond midway between the legs 28 and 29. The switching member 26 is pivoted on pivot 33, symbolized by a dash-dotted line and said switching member 26 can rotate freely around said pivot 33. The upper end of the switching member 26 is cut askew so as to provide a plane surface, which remains parallel with the lower plane surface of the protruding top of part 27, while the switching member 26 is rotated around the pivot 33. The lower end of the switching member is also cut askew and parallel to its upper end, so as to provide a plane surface remaining parallel to the similarly plane upper surface of legs 28 and 29, which upper surfaces are in turn parallel with the lower surface of the protruding top of part 27.

A rotation of the switching member 26 around the pivot 33, out of the plane of the drawing and back, from its position shown in full lines to the position shown in broken lines, has the same effect as that of the rotation of the switching member 18 in FIG. 2, and fulfills the purpose of the present invention. An advantage of the arrangement shown in FIG. 3 is that the air gaps connected in series in a magnetic circuit are kept to a minimum, and their length remains practically unchanged during the motion of the switching member 26. This means the device draws a primary exciting current considerably less than the exciting current drawn by other known voltage regulating or energy interrupting devices having moving switching members, and said exciting current can be kept approximately constant during the movement of the switching member 26 if the legs 28 and 29 offer approximately the same magnetic resistance.

Figure 4:
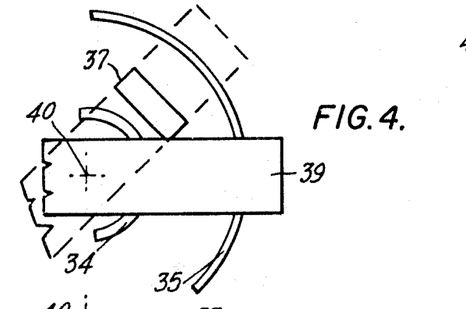
FIG. 4 is a schematic sketch showing a plan view of a further modification of the detail of upper right hand corner of FIG. 2 as another embodiment of the invention.
Figure 5:
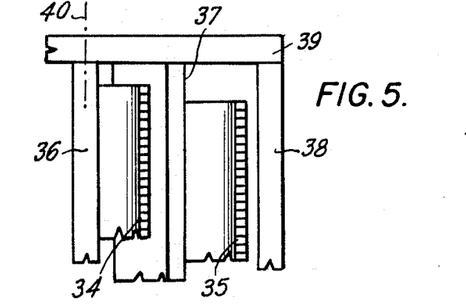
FIG. 5 is a schematic sketch showing a modified sectional elevation of the detail in FIG. 4.
Figure 6:
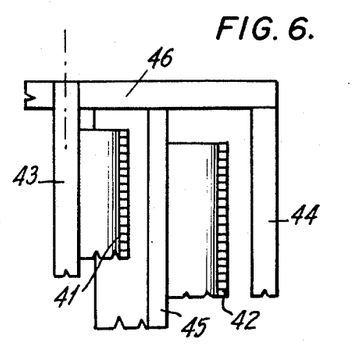
FIG. 6 is a schematic sketch showing a modified elevation of the detail in FIG. 4.

Similar results can be achieved by other shapes and arrangements of the switching member as shown in FIGS. 4 and 6. FIG. 4 is a plan view and FIG. 5 is a sectional elevation of another form of embodiment of the detail shown in the upper right hand corner of FIG. 2. FIGS. 4 and 5 show two telescoped coils 34 and 35, while secondary leg 37 is intermediate the coils 34 and 35. The structure and positioning of the coils 34 and 35, and legs 36, 37 and 38 are similar to the coils 11 and 12, and legs 13, 14 and 16 described in connection with FIG. 2. However, the top of the center leg 36 does not end in an extension but is cut flat, similar and parallel to the top ends of legs 37 and 38. A steel or metal pivot 40 is fixed into this top end of the center leg 36. A dash-dotted line symbolizes the axis of pivot 40, not shown in FIG. 5. The switching member 39 rotates freely around the pivot 40. The switching member 39 closes a magnetic circuit between legs 38 and 36 in the position shown in full lines. The secondary leg 37 is offset circumferentially from the plane connecting the legs 36 and 38. The dimensions and position of the legs 37 and 38, as well as those of the switching member are chosen such as to keep a considerable air gap between the corresponding surfaces of the switching member 39 and secondary leg 37 if the switching member 39 fully closes the magnetic circuit from center leg 36 to the outer leg 38. The result is that practically all of the magnetic flux will follow the route from center leg 36 to the outer leg 38 and not to the intermediate secondary leg 37, if the switching member 39 is in its position shown in full lines, whereas practically the whole magnetic flux will flow from the center leg 36 through the switching member 39 to the secondary leg 37 if the switching member 39 is swung around the pivot 40 into another position shown in broken lines in FIG. 4. This means that the electromagnetic link and the energy transfer between the coils 34 and 35 is interrupted if the switching member 39 is rotated from its position shown in full lines to its position shown in broken lines. The offset of the secondary leg 37 is shown in a degree such as to offer a limited path to the magnetic flux from the switching member 39 to the secondary leg 37 before its path from the switching member 39 to the outer leg 38 is completely interrupted, because the switching member 39 begins to sweep over the top of the secondary leg 37 before leaving the top of the outer core 38. This means the magnetic flux never has to cross a long air gap, but always finds a path of low reluctance through the magnetic material of either outer leg 38 of secondary leg 37, or both. Consequently, the primary current drawn by the coil 34 is kept to a considerably lower value than it would have been in a case of opening up large air gaps, as happens in other known energy interrupting or voltage regulating devices operating with switching members. Furthermore, the partial offset of the secondary leg 37 enables a gradual transfer of the magnetic flux from the outer leg 38 to the secondary leg 37 during the regulation of the voltage appearing across the coil 35 during the same time. The switching member 39 can stop at any point during its rotation, in which case the voltage is regulated from the full value across the coil 35, to lesser values dependent on the position of switching member 39. The number of secondary legs 37 and the outer legs 38, can be increased around the perimeter of the coil 34 and together with the switching member 39 can be dimensioned such as to result in a reduction and increase of the voltage alternating in the coil 35 if the switching member 39 is rotated. The frequency per second of such an alternating voltage is equal the number of rotations per second times the number of pairs of legs 37 and 38, if the coil 34 is fed by a direct current source. The form shown in FIGS. 4 and 5 and the forms shown in FIGS. 6 and 7 are especially suited for this kind of operation, but such an operation can be achieved in other forms of embodiment of the invention too, and the invention is not restricted to the examples shown.

Figure 7:
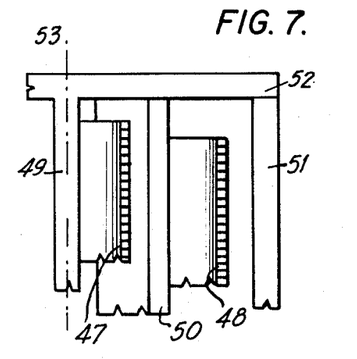
FIG. 7 is a schematic sketch showing another modified sectional elevation of the detail shown in FIG. 4.

FIGS. 6 and 7 show two more forms of embodiment of the detail shown in FIGS. 4 and 5. FIG. 6 is a sectional elevation of this different form of embodiment of said detail. The coils 41 and 42 in FIG. 6 are identical with the coils 34 and 35, respectively, in FIG. 5 and the legs 45 and 44 are identical with the legs 37 and 38, respectively in FIG. 5. The center leg 43 in FIG. 6 is similar to the center leg 36 in FIG. 5 but has a cylindrical extension upward. This extension provides a pivot for the switching member 46, which is similar to the switching member 39 in FIG. 5, except 46 has a cylindrical hole in its center, which hole mates the end of the center leg 43. The detail shown in FIG. 6 operates in the same way as the detail shown in FIG. 5, the switching member 46 rotating around the rotational axis shown in dash-dotted line. The omission of a pivot and the use of an extension of the center leg 43 as a pivot has advantages, because no magnetically conductive material has to be sacrificed to make room for the pivot, and the switching member 46 can be stabilized better on the bulky end of the core 43 than on a smaller pivot.

The coils 47 and 48 in FIG. 7 being a sectional elevation of another embodiment of the detail shown in FIG. 5, are again identical with the legs 37 and 38 in FIG. 5. The center leg 49 in FIG. 7 is similar to the center leg 36 in FIG. 5 but is integral with the switching member 52, and the whole part turns around the axis 53, symbolized by a dash-dotted line in the drawing. A pivot is fixed in the frame of the device, not shown in the drawings. The switching member, here, becomes an arm of the center leg 49, and this arm moves the same way and has the same function as the switching member 39 has in FIG. 5. The form of embodiment shown in FIG. 7 has the advantage that as the air gap at the top of the center leg 49 is eliminated, the excitation current drawn by the coil 47 is less than in a device built according to FIGS. 5 and 6 and that the center leg 49 and the switching member 52 combined present a rather sturdy part of the device.

Figure 8:
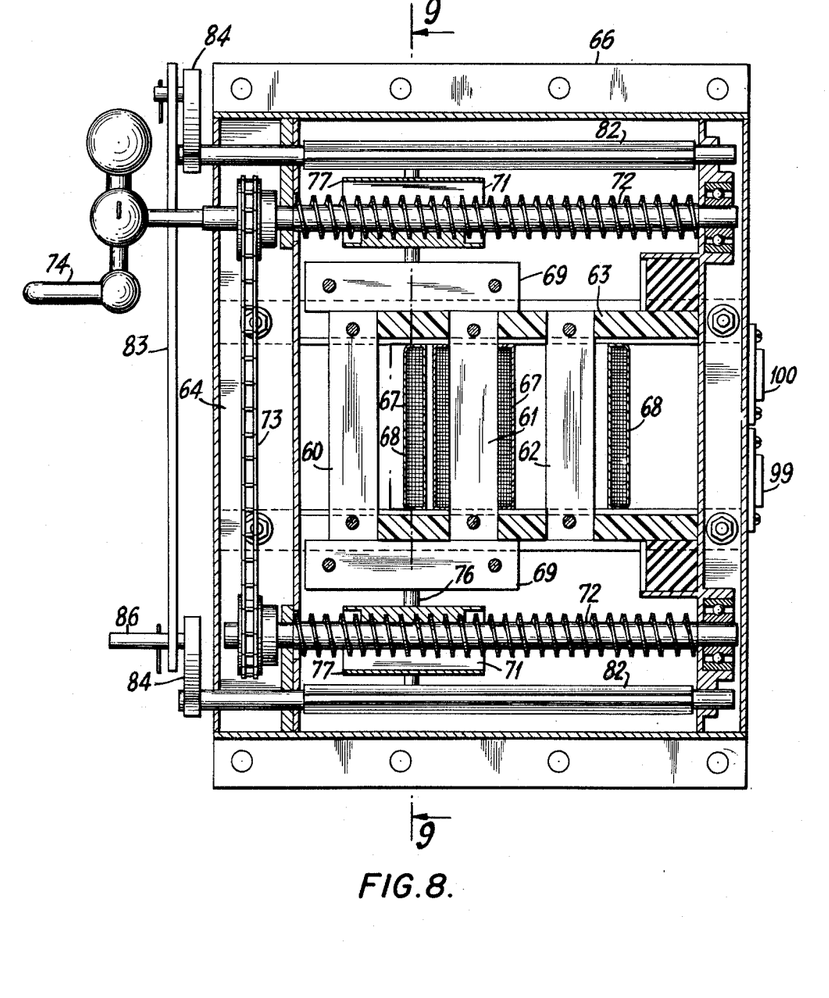
FIG. 8 is a diagrammatic sketch of a partially sectional side elevation of an electro-magnetic switch, voltage regulator and circuit breaker embodying the invention.

FIG. 8 illustrates a working embodiment of the invention that can be employed as a magnetic switch, voltage regulator and overload circuit breaker.

Figure 9:
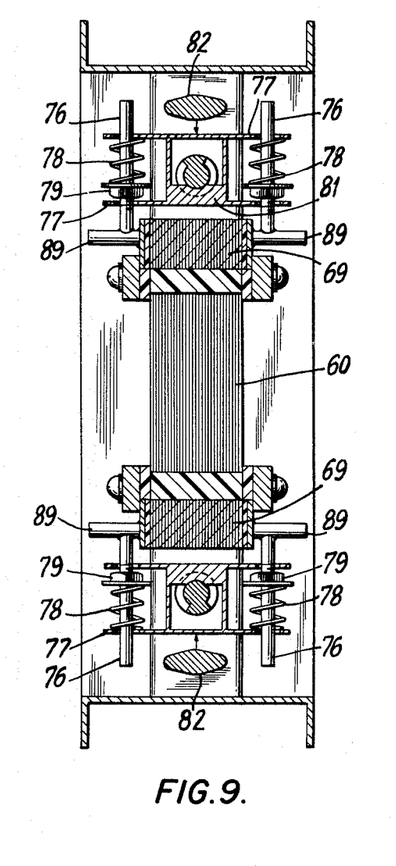
FIG. 9 is a diagrammatic sketch of a cross-section of the device illustrated in FIG. 8 taken along line 9—9.
Figure 10:
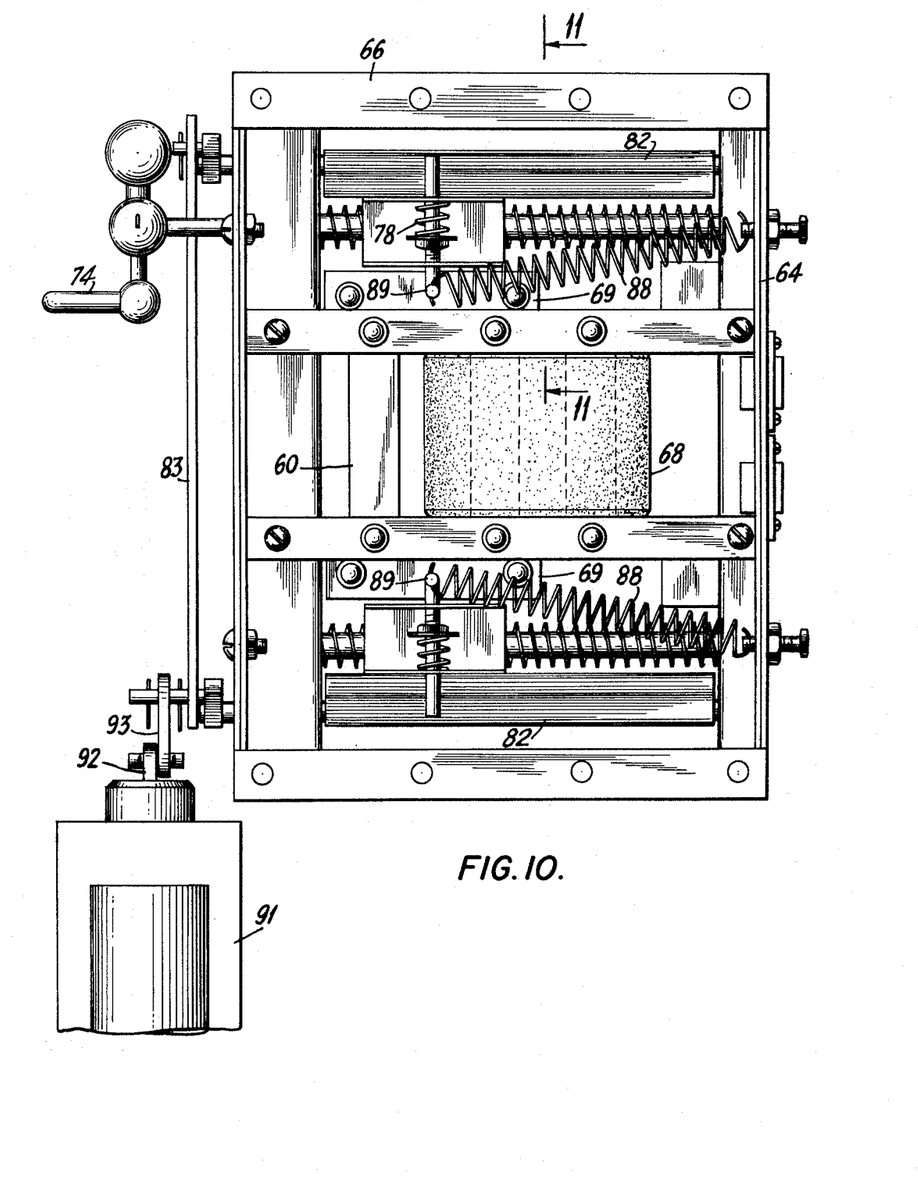
FIG. 10 is a diagrammatic sketch of a side elevation of the device illustrated in FIG. 8 showing the invention as an electromagnetic circuit breaker in mid-operation. The tensioned spring is snapping the carriage member to the right.

Referring to FIGS. 8, 9 and 10, the three legs 60, 61 and 62 made of electromagnetic material are held in evenly spaced vertical alignment by horizontal members 63, either made of non-magnetic material or magnetically separated from the vertical legs. The horizontal members are attached by bolts to vertical elements 64 of a rectangular container 66 which is adapted to enclose the electrical members. A primary coil 67 is wound around the leg 61 and a secondary coil 68 is wound around the leg 62 and around the leg 61 and the primary coil 67. Thus the leg 61 is the primary leg, the leg 62 is the secondary leg and the leg 60 is the outer leg. Two identical switching members 69 dimensioned to just connect the three legs when in a center position over primary leg 61, but making contact with only the primary leg 61 and outer leg 60 at positions left of center and with primary leg 61 and secondary leg 62 at positions right of center. The switching members 69 are composed, as are the legs 60, 61 and 62, of laminated magnetic material and serve as paths for the electromagnetic flux of the primary and secondary coils 67 and 68. Thus with primary coil 67 energized when the central leg 61 is connected to the leg 62 which is enclosed within the secondary coil 68, no magnetic flux links the secondary coil 68 and no voltage is induced in the secondary circuit which is attached to the coil 68. However, when the switching members 69 connect the center leg 61 with the leg outside of said secondary coil 68 a voltage is induced in the secondary coil by the electromagnetic flux flowing in the outer leg 60.

The switching members 69 are positioned in vertical alignment at the top and bottom of the legs 60, 61 and 62 and are moved linearly by means of two horizontal travelling members 71 which engage two driving screws 72 located above and below the top and bottom switching members 69 respectively. The travelling members 71 are made of non-magnetic material. The two driving screws 72 are interconnected by a driving chain 73 and the top driving screw has a crank and handle 74 for the manual rotation of said screws 72. Each horizontal travelling member 71 respectively engages the inner section respectively of the upper and lower driving screw 72 and are simultaneously propelled the length of the screws when said screws 72 are rotated. The travelling members 71 are attached to the switching members 69 by means of vertical posts 76 on either side of each said switching member 69 which extend through holes in overhanging inner and outer parts 77 of the associated travelling member 71, springs 78 on vertical posts are compressed between the vertical post bolts 79 and an overhanging outer member 77 of the travelling member 71. The tension of the springs 78 are adapted to keep the screw threads segments 81 of a travelling member 71 engaged with a driving screw 72 and to keep the switching member 69 in close contact with the extremities of the vertical legs 60, 61 and 62. By this arrangement the switching member 69 will not chatter and rattle as it is propelled across the vertical legs 60, 61 and 62 and the screw thread segments 81 of the travelling member 71 are kept engaged with the driving screw 72.

Above and below each driving screw 72 an elongate, eliptical in cross-section, members 82 are horizontally mounted for rotation about their longitudinal axes. The members 82 are interconnected by a shaft 83 and cranks 84 and adapted when operated by a handle 86 on one of the cranks 84 to rotate simultaneously in their mounting and to impinge with their long cross-sectional diameter on parts 77 of the travelling members 71 urging the travelling members inward against springs 78 and disengaging the screw thread segments 81 from the travelling screws 72.

Figure 11:
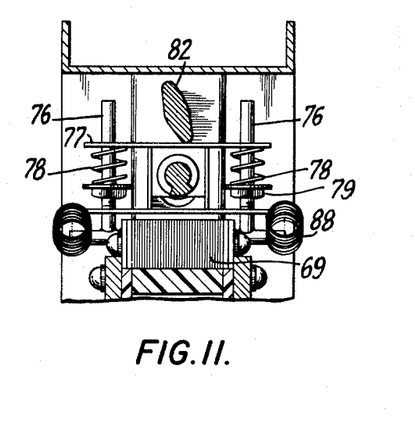
FIG. 11 is a diagrammatic sketch of the device illustrated in the upper portion of FIG. 9 illustrating the arrangements of the components when the invention is set up to act as an electro-magnetic circuit breaker.

Referring to FIGS. 10 and 11 the invention is illustrated as a circuit breaker. Approximately horizontal springs 88, attached at one end to the right vertical member 64 of the container 66 and at the other end to a horizontal lug 89 of the switching member 69, are tensioned when the switching members 69 are in position connecting the center leg 61 with the secondary leg 60. Means are provided for rotating members 82 for example, a solenoid 91 adapted to operate when the secondary circuit connected to the secondary coil 68 is overloaded. The operating arm 92 of the solenoid 91 is attached to crank 93 and adapted to rotate the elliptically cross-sectional elongate member 82 to disengage the travelling members from the driving screws 72. The switching members 69 are then moved by the contraction of the springs 88 to the right in the position in which the switching members 69 connect the center leg 61 with the secondary leg 62, reducing the voltage in the secondary circuit to approximately zero.

Figure 12:
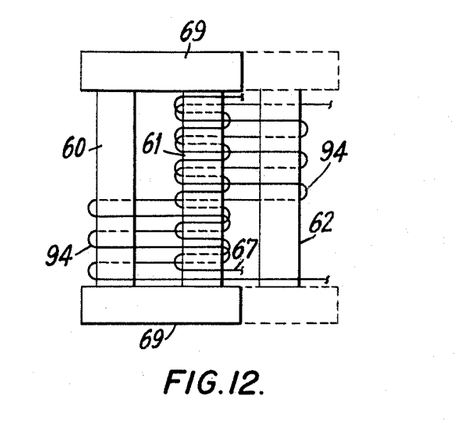
FIG. 12 illustrates diagrammatically the winding of the primary and secondary coil in an embodiment of the invention.

FIG. 12 illustrates an embodiment of the invention in which another secondary coil winding arrangement is illustrated. A secondary coil 94 is wound half around the center leg 61 and the right leg 62 and half around the center leg 61 and the left leg 60, thus making it possible as the switching members 69 move from one outer leg to the other to regulate the voltage in the secondary coil down to zero and to reverse the phase of the induced current.

Figure 13:
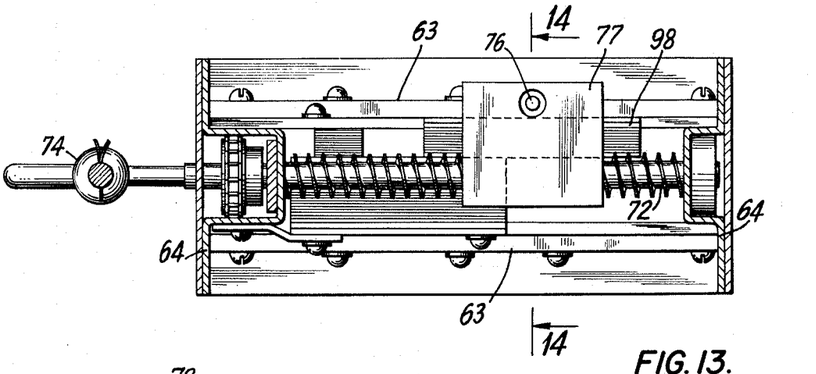
FIG. 13 is a diagrammatic sketch of the plan view of the invention illustrating an embodiment in which only a part of the electro-magnetic flux path breaking member is moved for fine adjustment of voltage regulation.
Figure 14:
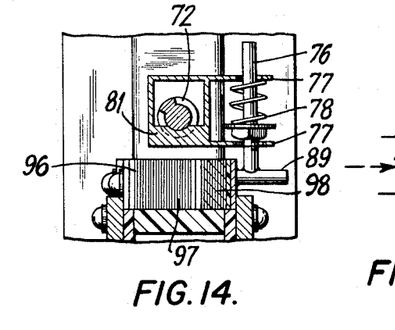
FIG. 14 is a diagrammatic sketch of a cross-sectional view taken along line 14—14 of FIG. 13.

Referring to FIGS. 13 and 14 an embodiment of the invention is illustrated in which part 96 of the switching member 97 remains stationary and the other part 98 is moved by the driving screw 72, thus making possible a finer setting and regulation of the flow of electrical energy in the secondary coil. The sliding portion 98 of each switching member 97 operates in a similar way to that of each switching member 69.

Referring to FIG. 14, the separation of the switching member 97 into two parts is further illustrated.

Inlet 99 and outlet 100 sockets, FIG. 8, on one side of the container 66 connect the primary 67 and secondary 68 coils with their respective circuits. In operation a source of primary electrical energy is plugged into the socket 99 leading to the primary coil. The secondary circuit is plugged into the outlet socket 100 leading to the secondary coil 68. With the switching members 69 in position as shown in FIG. 8 with the flux path of the primary coil core flowing to the leg 60 that is not enclosed by the secondary coil 68, a maximum voltage is induced in the secondary coil 68 and and appears at the outlet 100 and in the secondary circuit. When the crank and handle 74 of the drive screws 72 are rotated to drive the switching members 69 in the direction of the leg 62 that is enclosed by the secondary coil 68 less and less voltage is induced in the secondary coil 68 as the connection between the unenclosed leg 60 and the switching members 69 grows smaller and smaller until when the connection is broken both at the top and the bottom of the unenclosed leg 60 and connection is made with the enclosed leg 62 practically all voltage had ceased in the secondary coil 68. By moving both the top and bottom switching members 69 the amount of voltage induced in the secondary coil can be regulated to approximately 10% of the maximum voltage thus providing a voltage regulation of 90% without the use of any reverse winding. If only one switching member 69 is moved the voltage regulation is approximately 60%. The unexpected result of the double breaking of the magnetic path is a large increase in efficiency in use as a switch, voltage regulator and circuit breaker.

A secondary circuit can be not only interrupted, but also regulated by the described device. The voltage at the terminal 100 of coil 68 in FIG. 8 can be reduced while full voltage is maintained at the terminal 99 of coil 67. Such reduction of the voltage can be effected gradually by gradual movement of the switching members 68 and 69 from a position over the outer leg 60 to a position over the secondary leg 62. Reversal of this motion affects a gradual voltage increase at the terminal 100 of coil 68.

The examples shown as particular embodiments of the invention do not mean that the invention is restricted to these particular examples. Any other suitable shape of the core and coils can be used, and any other way of moving a switching member from a position in which it connects a center leg with an outer leg, to another position in which it connects the center with a secondary leg can be used as an embodiment of the invention.

Preceding examples of the embodiments of the invention show single phase, two-winding devices for reason of simplicity of presentation only. It is obvious that multi-phase devices, and devices with more than two coils can be built in the same way, and that in such multiple devices the same parts can assume multiple functions.

In a three-phase device, the center leg of the one phase can be simultaneously the outer leg of another phase, just as is usual in three-phase transformers. FIGS. 15 through 19 illustrate embodiments of the invention for three-phase application.

Figure 15:
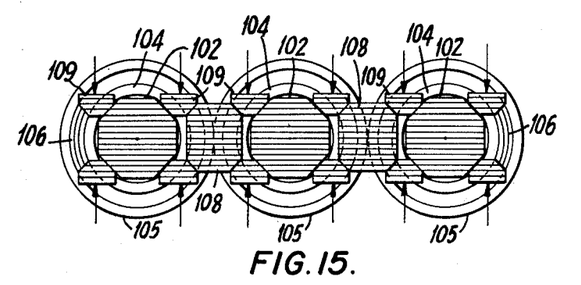
FIG. 15 is a schematic sketch showing the plan view of a modification of the invention for use with three phase A.C. and controlled by vertical linear motion.
Figure 16:
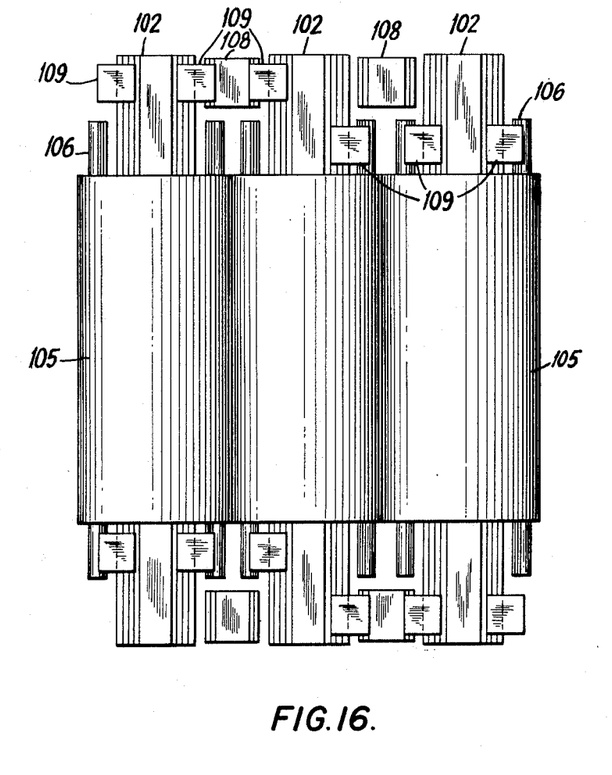
FIG. 16 is a schematic sketch partially showing the front elevation of the arrangement illustrated in FIG. 15.

Referring to FIGS. 15 and 16, only the top half of this embodiment of the invention is illustrated and will be described, the bottom half being identical.

Three primary legs 102 are arranged in line with their long axes parallel. Each primary leg is encircled by a primary coil 104 and a concentric secondary coil 105 of greater diameter. Diametrically opposed secondary legs 106 are arranged in the annular space intermediate the primary and secondary coil and transverse to a line joining the center of the ends of the primary legs. A yoke 107 comprising stationary parts 108 for holding the legs and coils in physical relationship and mobile parts 109 adapted to vertical linear movement for connecting and disconnecting the primary and secondary legs. With the mobile parts 109 in position as illustrated to the left of centerline of FIG. 16 at the ends of the primary legs, the primary legs of adjoining phases are connected and the respective primary and secondary legs are disconnected, the flux path going through the primary leg of the adjoining phase which acts as the outer leg of the first phase to induce a maximum voltage in the secondary coil 105 of the first phase when the primary coil is energized. With the part 109 in position as shown to the right of centerline of FIG. 16 the primary and secondary legs are connected providing a closed flux path between the primary and secondary legs so that the secondary coil 105 remains deenergized when the primary coil 104 is energized. Intermediate positions of the mobile parts 109 between those illustrated in FIG. 16 provides voltage regulation of the induced secondary voltage. Horizontal pressure is exerted on the mobile parts 109 of the yoke to reduce air gap and chatter.

Figure 17:
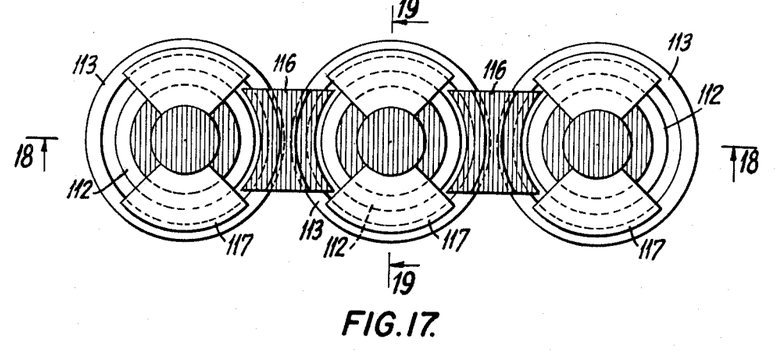
FIG. 17 is a schematic sketch showing the plan view of another modification of the invention for use with three phase A.C. and controlled by a horizontal rotary motion.
Figure 18:
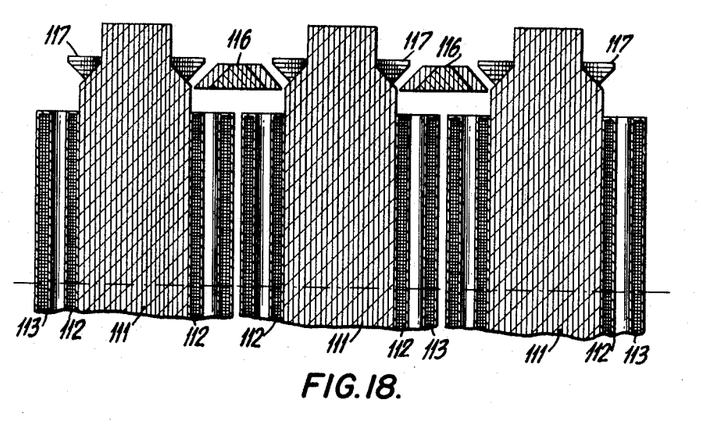
FIG. 18 is a schematic sketch partially showing the front elevation of the arrangement illustrated in FIG. 17.
Figure 19:
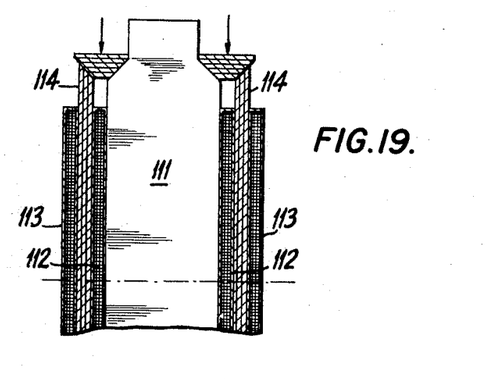
FIG. 19 is a schematic sketch partially showing a side elevation of the arrangement illustrated in FIG. 18.

FIGS. 17, 18 and 19 illustrate another embodiment of the three phase application. The arrangement of the primary legs and coils are similar to those illustrated in FIGS. 15 and 16. Each primary leg 111 is encircled by a primary coil 112 and a concentric secondary coil 113. Diametrically opposed secondary legs 114 are arranged intermediate the primary and secondary coils (see FIG. 19) and parallel to the line joining the centers of the respective ends of the primary legs. The stationary part 116 of the yoke is similar in structure and function to that previously described in connection with FIGS. 15 and 16. The mobile parts 117 of the yoke move rotatably to connect the primary legs of the adjoining phases and the primary legs with their respective secondary legs to function as described with FIGS. 15 and 16. Vertical pressure is exerted in the mobile parts of the yoke to reduce air gaps and chatter.

Figures 20, 22:
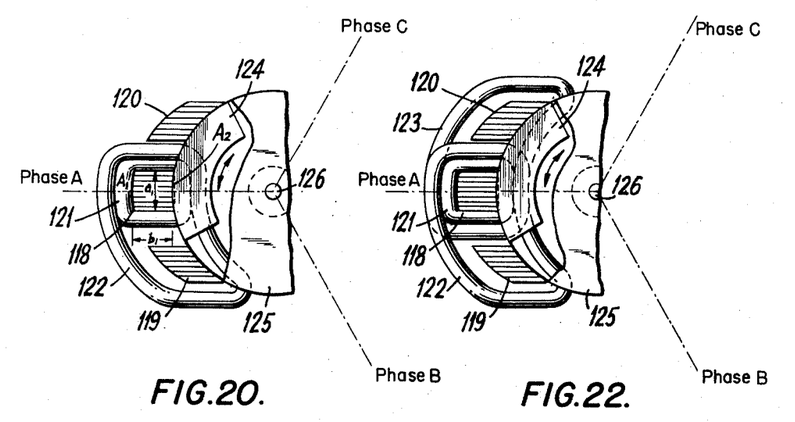
FIG. 20 is a partial perspective view of the invention in which the core members are segments of a ring.
FIG. 22 is a view similar to FIG. 20 showing an additional secondary winding.
Figure 21:
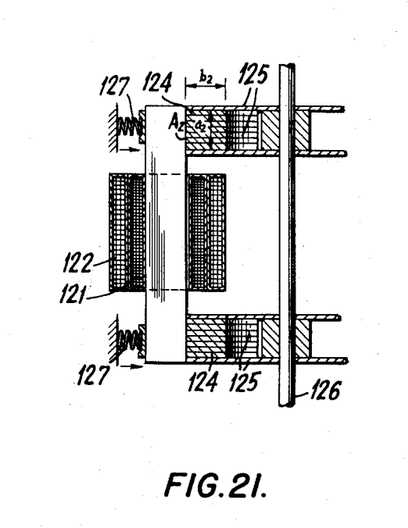
FIG. 21 is a side elevation view of the subject of FIG. 20.

FIGS. 20 and 21 illustrate another embodiment of the invention in which the advantages of rotary switching, close inexpensive mating of relatively moving parts, and three phase A.C. application can be felicitously united. Primary leg 118, secondary leg 119 and outer leg 120 are segments of a ring disposed and spaced about a common center. The vertical laminations comprising the legs can be arranged so that only minor machining is required to form an inner ring mating surface. A primary coil 121 encircles leg 118 and these plus the secondary leg 119 are encircled by the secondary coil 122. Leg 120 is designated the outer leg in reference to its position outside both primary and secondary coils.

Switching member 124 is formed of laminated sheets which are shaped and positioned to contact the ring segments inner mating surfaces at the top and bottom of the leg segments. Each member 124 is fixed between two opposed parallel disks 125 having diameters equal to that of the ring segments inner mating surface.

The disks of the upper and lower switching members rotate about a common axis of rotation 126 that passes thru the common center of the leg segments. The members 124 extend circumferentially to just connect the three legs when positioned directly opposite the primary leg 121 and to connect the primary leg to one of the other two legs when rotated respectively in one direction or the other. By dimensioning the uniformly spaced leg segments to fit within an arc of 120° arcs, two more sets of legs and switching members can be arranged around the disks 125. Provision is thus made for each phase of three phase A.C. as indicated by the dash-dotted lines offset by 120° and marked in FIG. 20 as Phase A, B and C. This arrangement provides a completely balanced design with very little friction in the center axis of rotation and with minimum force required to move the switching member. Springs 127 bias the legs against the switching member to minimize the air gap.

Figure 23:
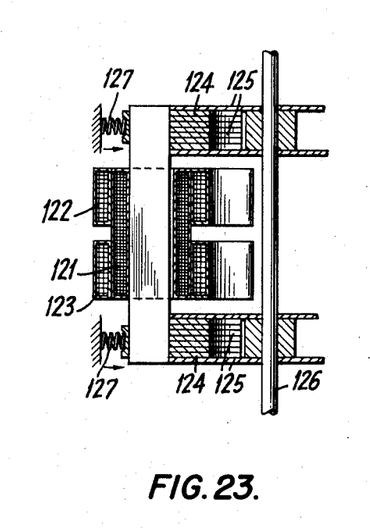
FIG. 23 is a side elevation view of the subject of FIG. 22.

FIGS. 22 and 23 illustrate a combination of the structure of FIGS. 20 and 21 with the secondary coil also partially around the outer leg 120 similar to the windings illustrated in FIG. 12. The advantages heretofore described with reference to FIGS. 20, 21 and 12 are combined in this arrangement.

Figure 24:
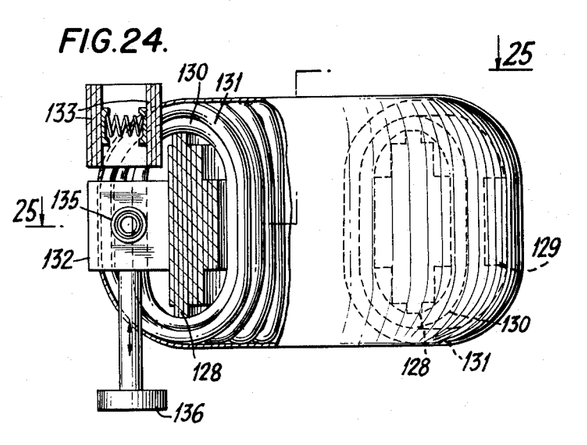
FIG. 24 is a vertical cross-sectional along a center line of a toroidal embodiment of the invention.
Figure 25:
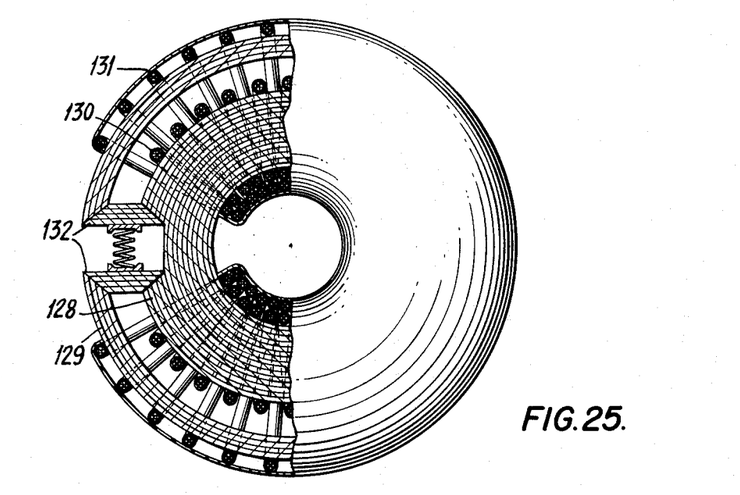
FIG. 25 is a cross-section of the embodiment illustrated in FIG. 24 taken along line 25—25.

FIGS. 24 and 25 illustrates a toroidal application of the invention. The primary leg 128 and secondary leg 129 are circular concentric members, the secondary leg being the outer one. The primary coil 130 is wound around the primary leg and the secondary coil is wound around both primary coil and leg and the secondary leg (see FIG. 25). As indicated in FIG. 24 the invention has the appearance of a doughnut with a segment missing to provide access to a cross-section of the legs. Switching members 132 and 133 are installed to bridge the toroid ends and each said member comprises opposing pairs of plates which are mounted in tandem on a handle 136 adapted to push-pull operation. The opposing plates of each pair of plates are separated by a spring 135 which bias the plates apart. The pairs of said plates are arranged at an angle of 90° with respect to each other. Thus one pair of plates bridge the interval between the primary and secondary legs as illustrated in FIG. 25 and the other pair bridges the spaces respectively at the cross-section ends of the primary leg 128 and of the secondary leg 129. Pulling the handle 136 downward causes the connection to change and finally interrupts the magnetic flux between the legs 128 and 129, to bridge the gaps between the ends respectively of leg 129 and leg 128.

Figure 26:
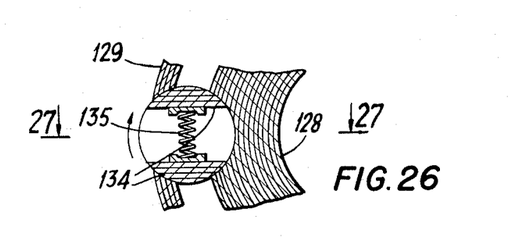
FIG. 26 is a partial view of FIG. 25 showing another switching member.
Figure 27:
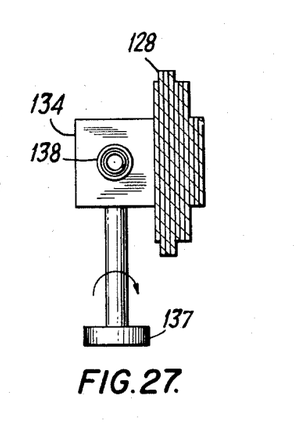
FIG. 27 is a side elevation view of the switching member shown in FIG. 26.

FIGS. 26 and 27 illustrate a variation of the switching member which comprises only one pair of parallel and opposing plates 134 biased apart by a spring 137 are mounted on a rotatable handle 137. The switching members are rotated to change from completing the flux path between the legs as shown in FIG. 27 to opening said flux path and uniting the ends of each of the legs. In both of the above cases the spring intermediate the plates acts to reduce the air gaps between the switching members and the legs.

In all of the embodiments of the invention a capacitor is connected in series with the primary winding of the device, to compensate for the inductive reactance of the regulator. The introduced capacitive reactance should be equal or less than the inductive reactance of the regulator, to avoid an undesired possible voltage rise.

It is recognized that a magnetic force acts on the switching member of the core, and another force has to be applied in order to counteract said magnetic force. It is of advantage to move the switching member in an angle to the direction of said magnetic force whereby said counteracting force can be reduced. The best reduction is effected if the switching member moves as close as possible at a right angle to the direction of the magnetic force acting upon them as shown in FIGS. 3 through 7.

It is further recognized that the resulting magnetic force, acting between the switching member and the fixed parts of the core, can be greatly reduced and that the impedance of the electric circuit can be easier controlled if the relative position and the dimensions of the switching member and fixed parts of the core are such as to result in the gradual closing of one magnetic path, through the secondary legs, simultaneously with the gradual opening of the other magnetic path between the central and outer legs. This means that the permeance of one path is gradually and simultaneously increased as the other is reduced, and the resulting permeance of the two remains approximately unchanged. The result is a reduction of the force acting between the switching member and the fixed parts of the core, and a much better control of the impedance of the coil and the primary current flowing in coil 1.

It is further recognized that the turn member of the coils in a device, constructed according to this invention, may have any ratio to each other. The voltage is the same between terminals separated by the same number of turns, whereas the voltage is different between terminals separated by a different number of turns. Built with proper turn numbers, a device, constructed according to the invention can unite the function of a transformer and the function of a circuit breaker and can replace both of these devices in cases where the transformer and the circuit breaker can be located at the same place, as is the case with substations, distributions switchboards, motor starters, etc.

It is recognized in this invention that a proper dimensional relationship between the cross-sectional area of the core legs, the cross-sectional area of the air gap between the core legs and switching members, and the cross-sectional area of the switching members is very important for the proper operation of the device. Noise, vibration and distorted wave form can result if the cross-sectional area of the air gap between the core leg and switching member is so small that the flux density across the air gap is very high. A reduction of this phenomena to an acceptable level can be accomplished only by increasing the cross-sectional area of the air gap and by a consequent reduction of the flux density across this area. The same increase of the cross-sectional area of the legs or switching members would require, however, a very much enlarged cross-sectional area of the core with greatly increased wire length in the coils. The arrangement illustrated in FIGS. 20 and 21 shows the manner the cross-sectional area of the air gap between leg and switching member can be increased without increasing the cross-sectional area of either the core leg or the switching member. FIGURES 20 and 21 show the cross-sectional area of the core leg 118, $A_1 = a_1 \times b_1$ and the cross-sectional area of the switching member 124, $A_2 = a_2 \times b_2$. Selecting $a_1$ and $a_2$ large and $b_1$ and $b_2$ small the cross-sectional areas $A_1$ and $A_2$ can be kept the same while $A_3$, the common contact area is increased. As a specific example these dimensions can be as follows: $a_1 = 1.5''$, $b_1 = 1''$, $a_2 = 1.5''$, and $b_2 = 1''$. This selection of the dimensions results in $A_1 = A_2 = 1.5$ sq. inch.

$$A_3 = a_1 \times a_2 = 1.5 \times 1.5 = 2.25 \text{ sq. inch.}$$

If 15,000 gauss flux density is chosen across $A_1$ and $A_2$ only 10,000 gauss density is crossing $A_3$.

It is claimed that in cases where a noise, vibration or wave distortion is a problem, $A_3$ should be at least $1.5 \times A_1$ or $A_2$.

Although I have described my invention with a certain degree of particularity it is understood that the present disclosure has been made only by way of example and that numerous changes in the details of construction and the combination and arrangement of parts be resorted to without departing from the spirit and scope of the invention as hereinafter claimed.

What I claim and desire to secure by Letters Patent is:

1. A magnetic switch and voltage regulator for inductively connecting and disconnecting an energized primary circuit having a constant voltage source with a secondary circuit and regulating the induced voltage of the second circuit while maintaining a constant exciting current flowing in the primary circuit, said switch and regulator comprising a plurality of individual magnetic legs each said leg having two oppositely disposed ends, non-magnetic supporting means for separately supporting each said leg in spaced sequent order, a primary coil wound on one said leg hereinafter called the primary leg and connected in the primary circuit to produce a magnetic flux in said leg, a secondary coil wound on said primary coil and said primary leg and at least one other leg hereinafter called the secondary leg and connected in the secondary circuit, a voltage being induced in said secondary coil by the magnetic flux produced by said energized primary coil, a third leg outside said coils, said primary leg being spaced intermediate said secondary leg and said third leg, magnetic switching means movable normal to the magnetic flux in said legs and positioned at both of the oppositely disposed ends of said sequentially arranged and spaced legs for selectively providing flux paths between said primary and said secondary legs and said primary and said third leg, means for interconnecting said switching means at said oppositely disposed ends of said legs for moving simultaneously as a unit, and means for moving said switching means to shift the magnetic flux path through said primary leg progressively from the secondary leg to said third leg, thereby providing a full range of voltage regulation in said secondary circuit.

2. A magnetic switch and voltage regulator as described in claim 1, characterized in that said primary, secondary and third legs are radially spaced apart and staggered circumferentially, and said switching means at the respective ends of said legs being rotatably movable about one of said legs simultaneously to connect said primary leg at both said ends alternatively with both said ends of said secondary leg and the ends of said third leg thereby providing voltage regulation of said secondary circuit ranging from approximately 10% to approximately 100% of said primary voltage.

3. A magnetic switch and voltage regulator as described in claim 1, characterized in that said legs are linearly spaced apart with respective leg ends in two parallel planes and said switching means being linearly movable to connect said primary leg at both its ends selectively to the respective ends of said secondary leg and the respective ends of said other leg, thereby providing voltage regulation of said secondary circuit ranging from approximately 10 to 100% of said primary voltage.

4. A magnetic switch and voltage regulator as described in claim 3, characterized in that said switching means at both ends of said legs are divided in a plane parallel to the plane of the sequent order of said cores and to the plane of switching means movement, a similar part of each said switching means remaining stationary and the other similar part linearly movable to provide a finer setting and voltage regulation in the secondary coil.

5. A magnetic switch and voltage regulator as described in claim 1, characterized in that said legs comprise primary legs for a second phase and third phase respectively of a three phase A.C. primary voltage source, and said switching means selectively connect said primary legs with each other and each said primary leg with a secondary leg.

6. A magnetic switch and voltage regulator as described in claim 1, characterized in that said legs are circumferentially spaced separate segments of a ring supported in radial position about a center axis with the respective segments' axial ends respectively disposed in common parallel planes, the primary core being the intermediate segment, said segments having radially inner and outer surfaces and said switching means comprising interconnected elements at the axial ends of said segments for magnetically simultaneously bridging the space between the inner surfaces of the axial end portions of adjacent circumferentially-spaced ring segments, said switching means being rotatable about said center axis and arranged in close proximity to the inner surface of said segments.

7. A magnetic switch and voltage regulator described in claim 6, characterized in that said segments in combination comprise a third of the circumference, a ring, two sets of similar segments completing said ring, and a switching means for each said set of segments, thereby providing a magnetic switch and voltage regulator for 3 phase A.C.

8. A magnetic switch and voltage regulator as described in claim 1, characterized in that said primary and secondary legs are two concentric rings, said primary legs having a partial segment taken out of its perimeter defining a partial gap and said secondary leg having an entire segment removed opposite the partially removed segment of the primary leg, thereby defining a full gap, a primary coil wound around the primary leg, and a secondary coil wound around the primary leg and coil and the secondary leg, switching means and other leg movably positioned in said full and partial gaps for selectively connecting said primary and secondary leg and closing the gaps in said secondary and said primary legs respectively.

9. A magnetic switch and voltage regulator as described in claim 1, further comprising resilient means for pressing said switching means and legs into close contact wtih one another to minimize air gaps and noise.

10. A magnetic switch and voltage regulator as described in claim 1, in which said switching means is movable in a direction substantially perpendicular to the axes of said legs and are engageable with side portions of said legs.

References Cited by the Examiner

UNITED STATES PATENTS

| | | | |
|---|---|---|---|
| 865,985 | 9/07 | Bains | 336—134 |
| 894,714 | 7/08 | Young | 323—51 |
| 2,683,820 | 7/54 | Sherman | 323—51 |
| 2,750,536 | 6/56 | Gomonet | 336—133 X |

LLOYD McCOLLUM, *Primary Examiner.*

MILTON O. HIRSCHFIELD, *Examiner.*